United States Patent [19]

Shacklette et al.

[11] Patent Number: 4,963,206
[45] Date of Patent: Oct. 16, 1990

[54] METHOD OF MAKING A THERMAL WINDOW GLAZING WITH CONDUCTIVE POLYMER COATING TO BLOCK RADIATIVE HEATING

[75] Inventors: Lawrence W. Shacklette, Essex; Kwan-Yue Jen, Middlesex; Helmut Eckhardt, Morris; Ronald L. Elsenbaumer, Morris; Ray H. Baughman, Morris, all of N.J.

[73] Assignee: Allied-Signal Inc., Morris Township, Morris County, N.J.

[21] Appl. No.: 347,546

[22] Filed: May 4, 1989

[51] Int. Cl.$^5$ .................... B32B 31/12; B32B 17/10
[52] U.S. Cl. ........................................ 156/99; 52/789; 52/790; 156/109; 350/331 R; 427/163; 427/164; 427/165; 428/34; 428/38; 428/1; 428/426; 428/442
[58] Field of Search ............... 52/788, 789, 790; 152/99, 100, 107, 109; 350/331 R; 427/163, 164, 165; 428/34, 38, 1, 426, 442

[56] References Cited

U.S. PATENT DOCUMENTS

| 4,157,417 | 6/1979 | Murphy. | |
|---|---|---|---|
| 4,226,910 | 10/1980 | Dahlen et al. | |
| 4,268,126 | 5/1981 | Mumford | 350/331 R |
| 4,321,114 | 3/1982 | MacDiarmid et al. | |
| 4,442,187 | 4/1984 | MacDiarmid et al. | 429/213 |
| 4,456,335 | 6/1984 | Mumford | 52/788 X |
| 4,848,875 | 7/1989 | Baughman et al. | 428/34 X |

OTHER PUBLICATIONS

Southwall Technologies, Total Performance in Insulating Glass, "Heat Mirror", 8.26a/Sou. pp. 1–8, (1985).
Scotchtint TM Sun Control Window Film–Scotchtint TM Plus All Season Window Film, Color and Performance Information Guide, Energy Control Products/3M.

Primary Examiner—Robert A. Dawson
Attorney, Agent, or Firm—Ernest D. Buff; Gerhard H. Fuchs

[57] ABSTRACT

A method is provided for minimizing radiative heat transfer and maximizing the transmission of visible light through a window having at least one pane. The method comprises the step of applying a transparent conductive polymer layer to a face of the pane, the polymer layer being reflective and absorptive in an infrared region of the electromagnetic spectrum and being transparent in the visible region of the spectrum, and having a transparancy ratio greater than 2.

32 Claims, 3 Drawing Sheets

METHOD OF MAKING A THERMAL WINDOW GLAZING WITH CONDUCTIVE POLYMER COATING TO BLOCK RADIATIVE HEATING

BACKGROUND OF THE INVENTION

1. Field of the Invention

This invention relates to the use of a conductive polymer material to selectively control, on the basis of wavelength, the light transmission through a transparent or semi-transparent panel or film; and more particularly to the use of a conductive polymer material to provide a window shade with high transmittance in a visible light range and high reflectance and absorbance in a near and far infrared range. Such a device may be embodied as a flexible plastic sheet, or as an integral part of a mutiple-pane insulating window panel.

2. Description of the Prior Art

Thermal-pane windows in which spaced multiple (two or more) panes provide a thermal barrier restricting heat conduction between the outside and the inside of a building are conventionally used to reduce heating and cooling costs. To further reduce cooling costs, window shades or blinds are used to block out intense, direct rays of sunlight, since conventional windows, insulating or otherwise, have little effect on radiative heating. In using conventional shades to eliminate solar glare, the view to the outside is blocked, creating a visually unattractive result. Products utilizing low emissivity glazing attempt to overcome the shortcomings of ordinary glass windows by covering glass or plastic film with a metal or metal oxide coating (e.g., HEAT MIRROR TM manufactured by Southwall Technologies of Palo Alto, CA or SCOTCHTINT TM manufactured by 3M Company of Minniapolis, MN.). This type of glazing offers transparency to visible light while partially blocking (reflecting) the infrared. There is, however, a need for increasing the degree of reflection and absorption of solar infrared radiation while maintaining substantially the same degree of transparency to visible light. There is also a need for reducing the cost of the present coated films.

Thus, there exists a need for a low cost, easy-to-fabricate window glazing which includes a coating that permits a high degree of coherent light transmission in the visible region of the electromagnetic spectrum and is highly reflective and absorbing in the near infrared (NIR) region and optionally in the far infrared (FIR) region. Such a window glazing can be used to limit radiative heating from the sun's rays (near-IR blocking) without blocking or obscuring the view from the outside. The characteristic of being reflective in the far IR limits passage of thermal (black body) radiation through the window, keeping the interior of a building or vehicle cool in summer and warm in winter.

Conjugated backbone polymers, e.g., polyacetylene, polyphenylene, polyacenes, polythiophene, poly(phenylene vinylene), poly(thienylene vinylene), poly(furylene vinylene), polyazulene, poly(phenylene sulfide), poly(phenylene oxide), polythianthrene, poly(isothianaphthene), poly(phenylquinoline), polyaniline, and polypyrrole, and the like have been suggested for use in a variety of electronic applications based upon their characteristic of becoming conductive when oxidized or reduced either chemically or electrochemically. Electrodes composed of such polymers can, according to the method of MacDiarmid et al. in U.S. Pat. No. 4,321,114, be reversibly electrochemically reduced to an n-type conductive state (the polymer being inserted by cations) or reversibly oxidized to a p-type conductive state (the polymer being inserted by anions).

The electrochemical oxidation or reduction process is generally recognized to be accompanied by sharp changes in the color of the polymer as well as its optical absorption coefficient (its ability to transmit light). An adjustable tint window based on the electrochemical switching of conductive polymers has been disclosed in a Wolf et al., U.S. Pat. application Ser. No. 211,537, filed June 27, 1988.

The adjustable tint window of Wolf et al is complex, requiring electrical circuitry, an electolyte and electrodes, which increase its cost.

SUMMARY OF THE INVENTION

The present invention makes use of conductive polymer materials to provide wavelength selective control of the intensity of light transmission through a window glazing for a building, automobile, or aircraft where heat control and blockage of NIR (780–2500 nm) and optionally FIR (2500 to 100,000 nm) radiation is desired.

In one aspect, the present invention provides a method for minimizing radiative heat transfer and maximizing the transmission of visible light through a window having at least one pane. Generally stated, the method comprises the step of applying a transparent conductive polymer layer to a face of the pane. The polymer layer is reflective and absorptive in an infrared region of the electromagnetic spectrum having a wavelength range extending from 780 to 2500 nm, being transparent in a visible region of the spectrum having a wavelength range extending grom 400 to 780 nm and havimg a transparancy ratio greater than 2.

The term "transparency ratio" as used herein refers to the normalized transmitted irradiance in the visible region of the spectrum (400 to 780 nm) divided by that in the near infrared region (780 to 2500 nm), assuming solar light as the illumination source. The normalized transmitted irradiance is herein defined as the trasparency and is computed from the irradiance over a given wavelength range transmitted through a given coating under solar illumination divided by the solar irradiance for the same wavelength range which is incident on the coating.

In another aspect, the invention provides an inexpensive window having a coating that is infrared reflective and absorptive and exhibits high transparency relative to visible light. That is to say, the ratio of visible transparency to infrared transparency (herein referred to as the transparency ratio) exhibited by the coating exceeds about 2:1.

More generally, the conductive polymer may be coated directly on the pane; or may comprise part of a multi-pane thermal window unit; or may be coated on a flexible plastic substrate adapted to be applied to a pane or disposed between sheets of glass for building, automotive, or other applications; or be applied directly or together with the substrate, to the surface of an existing window.

Advantageously, the thermal window unit, which preferably includes a thermal break, is resistant to radiative heating and conductive heat transfer between the exterior and interior. In one embodiment, it comprises a plurality of substantially parallel, spaced window panes, mounted in a window frame, a first of the panes having affixed thereto a conductive polymer layer providing the wavelength discriminating light transmittance specified hereinabove.

As used herein, the term "pane" means a transparent or semi-transparent, inorganic or organic material having mechanical rigidity and a thickness greater than about a millimeter.

The term "conductive polymer" coating or layer as used herein means a layer or sequence of layers containing an electrically conductive conjugated polymer. Such a layer may be comprised of a conductive polymer in the form of a blend or dispersion in a host polymer such as polyesters, polycarbonates, and polyacrylates. This conductive polymer layer may be applied directly on the surface of a pane or which may becontained in a suspension or emulsion which is adherent to the surface of a pane. The conductive polymer layer may also be free standing or may be applied to a flexible plastic sheet which may be applied as a retrofit to existing window panes or which may be supported between two rigid panes with or without a thermal break.

The window unit may further comprise a window frame means for securing the mutual orientation of a plurality of transparent, nonintersecting or, preferably, substantially parallel, sequentially spaced panes and for sealing and isolating a space there between; a first transparent pane mounted in the window frame means in a position toward an interior facing side of said frame means; a second transparent pane, nonintersecting with and, preferably, substantially parallel to and spaced from said first pane, mounted in said frame means in a position toward an exterior facing side of said frame means; a semi-transparent conductive polymer layer supported on a plastic sheet or third pane placed between said interior and exterior panes to form a triple glazed window having two thermal breaks to limit conductive heat transfer and a conductive polymer layer to limit radiative heat transfer.

Advantageous structural features are provided by the method and means of this invention. The conductive polymer layer on a plastic substrate may be readily produced as film on rolls for application to the sizeable area provided by either opposing face of the panes to form a double glazed window or it may be spaced between interior and exterior panes to form an effectively triple glazed window. A single or double thermal break is achieved without need for more than two panes of glass. The size, weight, and the cost of the window unit is markedly reduce, manufacturing procedures are simplified and the reliability and operating efficiency of the unit are increased.

An inert gas may be injected into the space or spaces delimited between the interior and exterior panes or the space(s) may be evacuated to the extent practical to enhance thermal conductivity break characteristics.

A further major advantage of the current invention is that the conductive polymer in the preferred forms of a solution, suspension, or emulsion can be readily applied to a substrate pane or plastic film by various low cost and efficient means known in the art such as spin coating, spray coating, dip coating, or extrusion coating.

BRIEF DESCRIPTION OF THE DRAWINGS

The invention will be more fully understood and further advantages will become apparent when reference is made to the following detailed description of the preferred embodiment of the invention and the accompanying drawings in which.

DETAILED DESCRIPTION OF THE INVENTION

Figure 1:
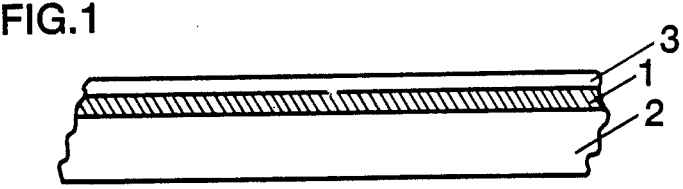
FIG. 1 is a sectional view depicting a single pane window having an IR-blocking conductive polymer layer.

Referring specifically to the drawings, in FIG. 1, there is shown a single pane, 2, having applied thereto a conducting polymer layer, 1, that is also supported on a plastic sheet, 3, which both supports the conductive polymer layer before application and provides protection in the final embodiment from air, water and abrasion.

Figure 2:
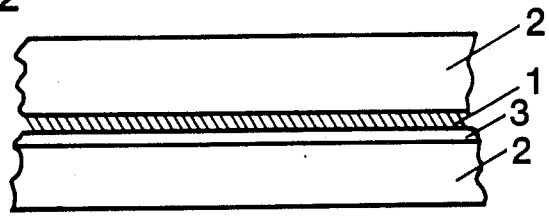
FIG. 2 is a sectional view depicting a laminated, double pane window.
Figure 3:
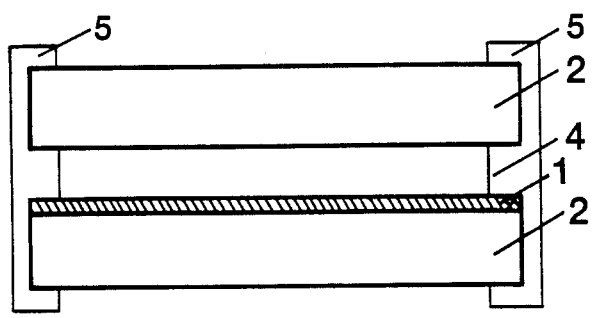
FIG. 3 is a sectional view depicting a double glazed window with a thermal break.
Figure 4:
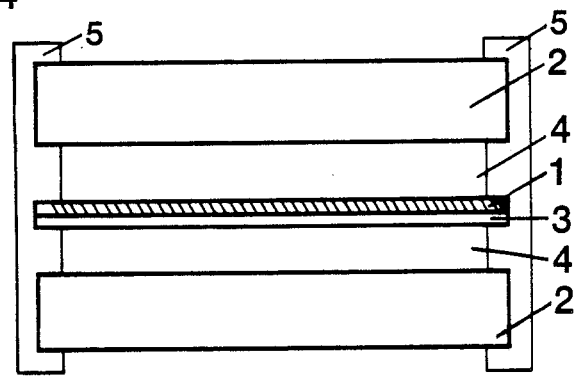
FIG. 4 is a sectional view depicting a triple glazed window with a double thermal break.

FIG. 2 shows the conductive polymer 1 which was originally supported on the plastic sheet, 3, laminated between two sheets of glazing. In this embodiment the plastic sheet, 3, can also provide impact and shatter resistance to the laminate. FIGS. 3 and 4 show window units which include one and two thermal breaks, 4, respectively, formed by mounting the panes, 2, and the coated film, 3 and 1, within a frame, 5. To enhance the thermal barrier effect, the space, 4, may be evacuated to the extent practical, or filled with an inert gas selected from the group consisting of argon, nitrogen, dry air, neon and mixtures thereof. Use of an inert gas, such as argon, inside of the thermal pane can be usefully employed to prevent corrosion or oxidative degradation of the conductive polymer and adhesive window components. It may also be advantageous in certain embodiments to include a dopant gas, such as an oxidant or an acid, within the thermal break. This dopant gas would be employed to maintain the conductive polymer in its highly conductive and infrared absorbing state, and in certain cases to maintain the constancy of the optical transmission characteristics with time.

The vapor pressure of a dopant gas, or an agent which coinserts with the dopant, can be varied so as to vary the optical transparency and the transparency ratio of the conductive polymer film. Such variability can be used to control the solar transmission of the window. To obtain such variability, it is necessary to use dopants or coinserting agents which are only weakly bound to the polymer, the binding having sufficient weakness that the agent is substantially removable under dynamic vacuum. A dopant with such weak binding is chosen to have barely sufficient oxidizing strength (p-dopants) or reducing strength (n-dopant) to result in the formation of a ground-state charge-transfer complex. The lower the ionization potential of the polymer, the lower the election affinity of a suitable electron acceptor dopant, the lower the electron affinity of the polymer, the lower the ionization potential of a suitable electron donor dopant. Such optional variable transparency requires that the charge-transfer process be reversible. One example of such a reversible doping process is the vapor-pressure dependent doping of poly(p-phenylene vinylene) with iodine or the vapor-pressure dependent doping of polyaniline with HC1 vapor. An increased concentration of these dopants in the conductive polymer as a consequence of an increased gas pressure of the dopant generally increases the infrared absorption and reflectivity of the polymer and decreases the visible absorption and reflectivity of the polymer. Similarly, the vapor pressure of an agent which coinserts with the dopant can be used to control optical transparency and the transparency ratio defined herein. For example, water vapor, the vapor of an alcohol, or the vapor of a polar organic solvent such as acetonitrile or benzonitrile generally increases IR and FIR absorption of acid-doped polyaniline. The increased vapor pressure of dopant or coinserting agent can be controlled automatically via the evaporation effects of solar heating or by conventional gas pressure pumps.

When the conductive-polymer-coated plastic sheet is to be edge supported as it is shown in FIG. 4 or as it would be applied to an existing window frame and spaced from the pane or panes thereof, it is advantageous for the supportive plastic sheet to be heat shrinkable. Such heat shrinkability will facilitate elimination of wrinkles and will serve to maintain the edge-supported sheet in tension.

The polymer coated plastic sheet can be affixed to a pane as in FIGS. 1, 2 and 3 by means of a suitable adhesive. A variety of adhesives can be conveniently utilized. Preferably the adhesive should thoroughly wet and evenly coat the surface of the pane and the opposing face of the coated plastic sheet, so as to ensure proper bonding and the elimination of spurious void spaces which can scatter light and interfere with sound mechanical adhesion. Also, the said adhesive is preferably colorless and either amorphous or microcystalline with a crystallite size much smaller than the wavelength of light, so that negligible light scattering or absorption of light occurs at the adhesive interface. Adhesives found especially suitable for this purpose are certain polyvinylacetate adhesives, or cyanoacrylate adhesives and the like. The supporting plastic sheet is preferrably a strong, transparent film as for example provided by various polymers such as polymethylmethacrylate, polycarbonates, polyesters and the like.

Conductive polymers, are intended for use as the primary infrared blocking substance. These conjugated polymers may be either anion inserting (p-type) or cation inserting (n-type). Oxidized (p-type) conductive polymers are prefered.

The thickness of the conductive polymer layer may be adjusted to achieve a desired degree of optical transparency to visible light. While the degree of transparency will depend on the choice of polymer and the doping level of that polymer, transparency in the range from 5 to 95% will typically be obtainable with a layer of conductive polymer having a thickness in the range from 10 to 1000 nm.

Suitable anion inserting (p-type) polymers which may be used separately or in combination include those polymers which are substantially transparent in their conductive (anion-inserted) state. Suitable polymers include oxidized polyacetylene, poly(alkoxyphenylene vinylene), poly(thienylene vinylene), poly(furylene vinylene), polyaniline, polypyrrole, polyisothianaphthene, poly(carbazole), substituted versions of the above, blends of the above, and copolymers of the above.

With the exception of polypyrrole and polyaniline, these suitable polymers are generally characterized in their undoped neutral state by a relatively small electronic band gap which should be preferably less than about 2.0 eV, more preferably less than about 1.6 eV and most preferable less than about 1.4 eV. In such most preferrable cases, the polymer in its doped state will generally provide the aesthetic advantage of being relatively untinted. It is generally preferrable that the polymer have high molecular weight (to achieve the lowest band gap and to provide the desirable mechanical properties) and that it have a minimal fraction of low molecular weight oligomers and a minimal degree of disorder in order to minimize absorption in the visible range when the polymer is in its conductive state. The ability of the polymer to reflect infrared light will also be a function of the electrical conductivity of the polymer, which is generally improved by having high molecular weight. High conductivity is particularly important to obtain high reflectivity in the far infrared region of the electromagnetic spectrum. High reflectivity in the FIR region is important in the reflection of thermal radiation emanating during warm weather from hot objects on the outside, such as building faces and pavement, or during cool weather from hot objects on the inside, such as heating radiators or other interior objects which are warmer than the outside. The spectral range of most importance for this task of ambient heat reflection can be judged from Wien's Law which gives the peak of the blackbody radiation curve as a function of temperature. For temperatures in the range 300 to 400 Kelvin, the peak is between 7000 and 10,000 nm.

For certain conducting polymers, especially those of low molecular weight, the absorption characteristics are determined by molecular weight. However, more generally the absorption characteristics are a consequence of the length of polymer chain within which electronic connectivity is uninterrupted by chemical or structural defects. This length is referred to as the conjugation length. The absorption maximum will generally shift toward longer wavelength with increasing conjugation length. Adjusting the conjugation length of the conducting polymer, therefore, provides a method for adjusting the color of the polymer film as well as the transparency ratio. A mixture of conjugation lengths. a mixture of different conducting polymers, or a mixture of conducting polymers in combination with other optical absorbing materials (such as dyes, or metal or metal-oxide layers) can be used to achieve specific desired absorption characteristics, such as neutral coloration in the visible or high reflectivity in the FIR. When a number of absorbing layers are used in conjunction, the overall transparency of the window will be, to good approximation, a function of the sum of the absorbances of the separate layers.

Figure 5:
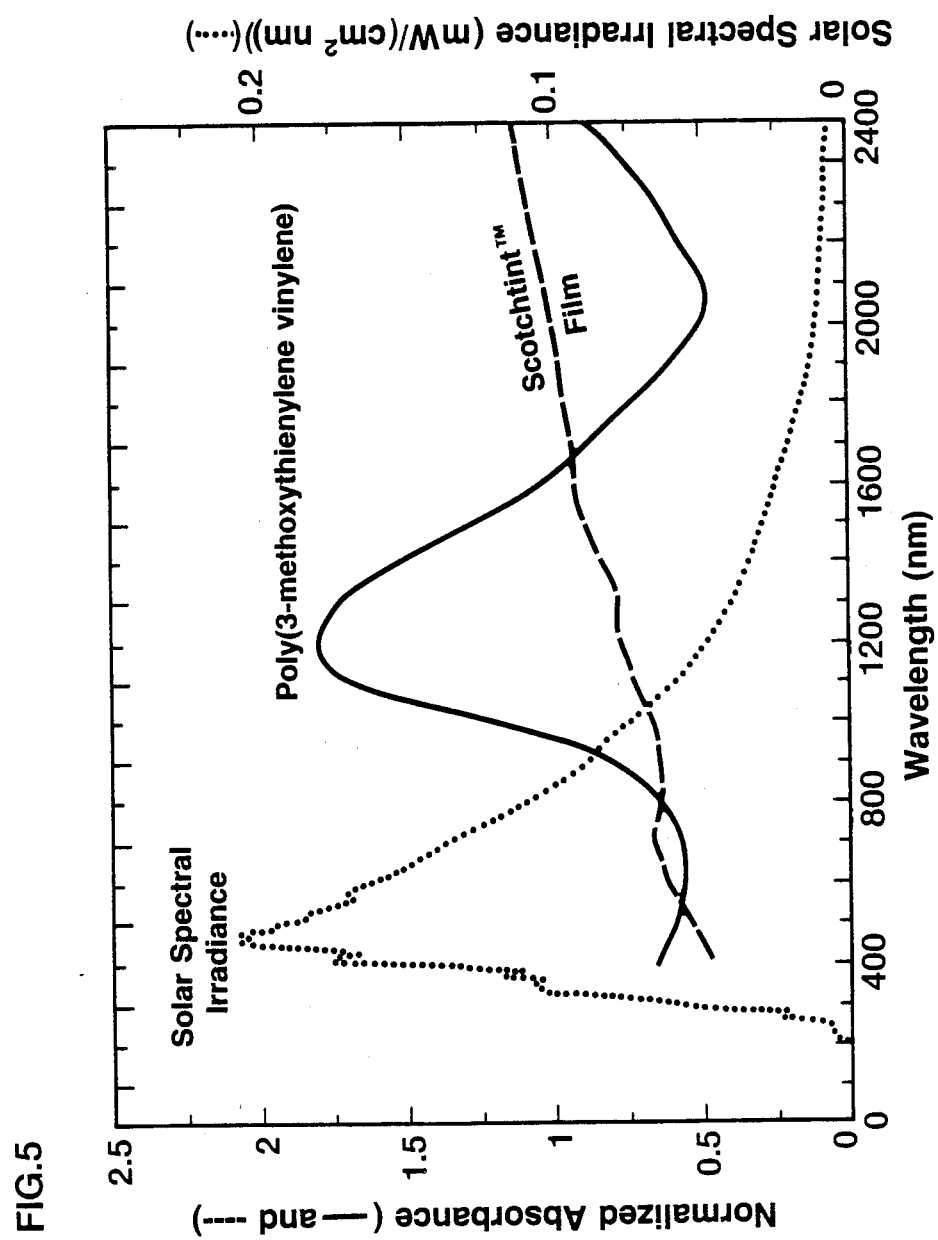
FIG. 5 is a graph depicting normalized absorbance as a function of wavelength for a poly(3-methoxythienylene vinylene) film (solid line) of the present invention and a Scotchtint TM P-19 film manufactured by 3M Company (dashed line), the graph further depicting the solar spectral irradiance (dotted line) as a function of wavelength, the solar spectral irradiance being the hypothetical illumination source for the films of the present invention and the absorbance of the films being normalized to give each of the films 25% transparency to solar light in the visible range (400 to 780 nm).

The ability of the conductive polymer coating to reflect and absorb solar radiation in the near-infrared region (780 nm to 2500 nm) is the most significant advantage of this invention. The predominant part of the sun's radiation to which the eye is not sensitive lies immediately beyond the red end of the visible spectrum in the near-infrared (NIR) region (cf. FIG. 5). Blocking this near IR radiation is of key importance in reducing the cooling load for both buildings and vehicles, and in improving the comfort of the occupants. To this end, it is highly desirable to have a window coating material which has a low absorption in the visible light range, but which has an absorption which increases rapidly at wavelengths longer than 780 nm. For aesthetic purposes, it is preferred that the region of low absorption (high transmission) in the visible light range be broad enough to cover a large portion of the visible light range (390 to 780 nm) and relatively constant with perhaps a slightly increasing absorption toward the red end of the spectrum. These conditions will lead to a coating which is untinted (neutral density) or which possesses only a slight bluish cast. If a tint is desired, it is possible to include a separate tinting agent in the glazing or in the coating. This tinting agent can, in fact, also be a doped or undoped conductive polymer. For example, a blue tint could be obtained with doped poly(dimethoxyphenylene vinylene) or undoped polyaniline, and a green tint from doped polyaniline.

In order to better eliminate glare and to increase the efficiency of the conductive polymer coating in blocking infrared rays, the polymer chains can be oriented on the substrate to provide a polarizing effect. The direction of orientation can be adjusted to selectively eliminate reflected rays (glare). The conductive polymer can be preferentially oriented to achieve a polarization of light by drawing of the substrate (for a polymer substrate) after the conductive polymer is deposited, by grooving the substrate prior to deposition, by imposing a shear during solution deposition, or by other chain orientation methods.

For the purpose of reducing glare from reflected or scattered solar light, the preferential alignment of the polymer chains in a verticle direction is most desirable. Utilization of two polarizing layers of conductive polymers, having mutually orthogonal preferential chain orientation, generally provides a lower transmission of solar radiation and a higher transparency ratio than would the same total thickness of an unoriented polymer film or a polymer film with a single direction of preferential chain alignment.

It is sometimes preferable to utilize a layer of conductive polymer which has higher thickness at the top of the window pane than at the bottom. This variation of thickness has the benefit of decreasing solar transmittance compared with that which would result if the thinner coating was applied uniformly over the window, while still providing high transparency in the visible for that portion of the window most used for external viewing.

The conductive polymer window coating can also be used in conjunction with a second type of window coating material, one which can be switched electrically between states of different transparency. Liquid crystal films as the second type of window coating material are herein preferred and are described in U.S. Pat. Nos. 4,268,126 and 4,456,335 as well as U.S. patent application Ser. No. 066,299, filed June 25, 1987 and now U.S. Pat. No. 4,848,875. The conducting polymer layer can also serve as at least one of the necessary electrical contacts to the liquid crystal layer, while additionally providing the desired IR absorption characteristics.

Among the above listed polymers, those which are substantially transparent in their oxidized state are preferred. These preferred polymers include polyacetylene, polyaniline, poly(thienylene vinylene), poly(furylene vinylene), poly(alkylthienylene vinylene), poly(alkoxythienylene vinylene), poly(alkoxyfurylene vinylene) and polyisothianaphthene which are all substantially transparent in their oxidized state when prepared as a thin film (a thickness less than about 100 nm).

More preferred for their superior transparency to visible light and for their low level of tint are poly(alkoxythienylene vinylene), poly(alkylthienylene vinylene), poly(alkoxyfurylene vinylene) and polyisothianaphthene.

The utility of a given conductive polymer in this invention is also strongly affected by the degree of stability of the transparency of the conductive polymer in the presence of sunlight, humid air and water. Although in certain embodiments (as in FIGS. 3 and 4) the conductive polymer can be protected from the ambient environment by being enclosed in an inert atmosphere, it is clearly most desirable if the conductive polymer can be handled and stored in air. In this regard, polyaniline and the poly(alkoxythienylene vinylenes) are most preferred. Any instability resulting from exposure to ultraviolet light can be reduced through the application of ultraviolet blocking agents known in the art. These UV blockers can be incorporated in the conductive polymer or applied separately to the window glazing.

Another important attribute affecting utility is the convenient processibility of the polymer. In this regard polyisothianaphthene is relatively intractable; however, the material can be processed to form a suspension or emulsion which can be used to coat a glass or plastic substrate. Among the preferred polymers, those containing vinylene linkages are the most conveniently processed since they can either be processed via a water soluble nonconjugated polyelectrolyte precursor, or in the case of butoxy and longer chain alkoxy groups, can be made soluble in their conjugated forms in a variety of common organic solvents. These solutions can be readily used to coat glass or polymer substrates by standard processes known in the art such as dip coating, spray coating, spin coating, and extrusion coating.

On the basis of conductivity, processibility, stability, transparency and low level of tint, the poly(alkylthienylene vinylenes) and the poly(alkoxythienylene vinylenes) are preferred. Most preferred are the poly(alkoxythienylene vinylenes) with the alkoxy substituent(s) in the 3- and/or 4- positions on the thiophene ring, $CH_3(CH_2)_nO$, where n lies in a range from 0 to 11.

The electrically conductive forms of the conjugated polymers of this invention are formed by doping corresponding neutral forms of the polymer in solution or in the solid state. In general, these doped conductive forms are prepared in the preferred method by treatment of the conjugated polymer with chemical oxidizing agents (p-type dopants) or by electrochemical oxidation at the anode in an electrochemical cell. These procedures are described in more detail in U.S. Pat. Nos. 4,442,187 and 4,321,114. Dopants for use in the practice of this invention can vary widely and can be such materials which are known in the art for use in doping conjugated backbone polymers to form conductive or semiconductive polymers, as for example those described in detail in U.S. Pat. Nos. 4,442,187 and 4,321,114 which are hereby incorporated by reference. Illustrative of useful electron acceptor dopants are $I_2$, $AsF_5$, $AlCl_3$, $MoCl_5$, $NO^+$ and $NO_2^+$ salts (such as $NOBF_4$, $NOPF_6$, $NOSbF_6$, $NOAsF_6$, $NOCuCl_3$, $NO_2BF_4$, $NO_2AsF_6$, $NO_2SbF_6$, and $NO_2CF_3SO_3$), $O_2^+AsF_6^-$, $HClO_4$, $HNO_3$, $H_2SO_4$, naphthalenesulfonic acid, p-toluenesulfonic acid (TsOH), benzoyl peroxide, $CF_3SO_3H$, trifluoroacetic acid, $SO_3$, $Br_2$, $(FSO_3)_2$, $FSO_3H$, $Fe(ClO_4)_3$, $FeCl_3$, $Fe(OTs)_3$, $Fe(CF_3SO_3)_3$, silver salts such as $AgSbF_6$, $AgCF_3SO_3$, and $AgOTs$, which give rise to doped polymers containing dopant ions such as $I_3^-$, $NO_3^-$, $BF_4^-$, $PF_6^-$, $AsF_6^-$, $SbF_6^-$, $CF_3SO_3^-$, $CF_3CO_2^-$, $MoOCl_4^-$, $MoCl_6^-$, $HSO_4^-$, $AlCl_4^-$, $ClO_4^-$, $OTs^-$, $SO_3^-$, $C_6H_5CO_2^-$, $Br_3^-$, $CH_3SO_3^-$, $FSO_3^-$, and $FeCl_4^-$. Other useful electron acceptor dopants include electrolyte salts such as $LiClO_4$, $LiBF_4$, $LiAsF_6$, $NaPF_6$, $Bu_4NClO_4$, $Bu_4NClO_4$, $Bu_4NOTs$, $LiCF_3CO_2$, $Bu_4NCF_3SO_3$, $LiCF_3SO_3$, $AgOTs$, and the like, which can be dissolved in a suitable solvent and used to dope the homcpolymer or copolymer by electrochemical oxidation of the polymer at the anode of an electrochemical cell or by chemical oxidation with a separate oxidant.

Still other useful dopant solutes include the metal or organic salts of the aforementioned anions, or polymeric electrolytes such as polymers substituted with one or more anionic functional groups such as carboxylic acid or sulfonic acid groups, as for example polyethylene sulfonic acid, polyacrylic acid, polymethacrylic acid, polystyrene sulfonic acid and copolymers thereof which can be incorporated into the polymer as the dopant solute concomitant with oxidizing the polymer with an oxidant such as oxygen, hydrogen peroxide, $KS_2O_8$, $NaClO_3$, $Br_2$, $Cl_2$, $NaClO_4$, and the like.

Preferred for use in the practice of this invention are electron acceptor dopants. While we do not wish to be bound by any theory, it is believed that solid articles composed of polymers doped with electron acceptor dopants are more stable to air and water vapor. Particularly preferred for use in the conduct of this invention are electron acceptor dopants which impart superior thermal stability, which include those dopants which form a p-type complex of the polymer with an anion containing one or more sulfonate groups such as methane sulfonate ($CH_3SO_3$), benzene sulfonate ($C_6H_4SO_3^-$), p-toluene sulfonate ($OTs^-$), benzene disulfonate, dodecylbenzene sulfonate, naphthalene sulfonate, naphthalene disulfonate, naphthalene trisulfonate, polyethylene sulfonate, polystyrene sulfonate, and the like.

EXAMPLE 1

A transparent plastic sheet coated by a conductive polymer was fabricated by depositing polyaniline on a film of Aclar ® (a registered trademark of Allied-Signal Inc.) [a blend of poly(trifluorochloroethylene) and poly(vinylidene fluoride)] by exposing the Aclar film to a mixture of aniline tosylate and ammonium persulfate in an aqueous solution of tosic acid. The coated plastic sheet appeared substantially transparent with a light green tint. UV-visible and near IR spectra were taken on the polyaniline-coated Aclar film. The film was found to be substantially transmissive (approximately 74% transmission) over a spectral range extending from about 475 nm to 585 nm. The absorbance of the film increased upon going into the near IR, where a 47% transmission was observed over the spectral range from about 800 to about 1200 nm. Absorption and/or reflection within this spectral range acts to block solar near-infrared radiation.

EXAMPLE 2

Poly(methoxythienylene vinylene) was prepared according to the procedure of K-Y Jen et al. (J.C.S. Chem. Commun. 1988). A fraction of this polymer was dissolved in tetrahydrofuran (THF) and dip coated on a quartz slide for optical spectroscopy measurements. The polymer was doped by immersion in a solution of $NOSbF_6$ in acetonitrile. Spectra were taken for both the doped and undoped films. The undoped polymer was characterized by a strong absorption approximately centered within the visible frequency range. The undoped film was dark blue. However, when the film was doped, it became substantially transparent with a slight blue-gray cast. Optical absorbance measurements indicated that the doped film had a broad region of high transparency which nearly encompassed the entire visible spectrum (75% transmission from about 400 nm to about 800 nm). A broad absorption band from about 1080 to about 1320 nm allowed only an average 50% transmission in this region where it is desirable to block solar infrared radiation. An additional absorption band was observed to begin rising at wavelengths longer than 2000 nm which contributed toward the reflection of thermal infrared emmissions. The doped film was found to be stable in the atmosphere.

EXAMPLE 3

Poly(butoxythienylene vinylene) was synthesized as in Example 2. A film doped with $SbF_6^-$ counterions was coated onto a glass slide. The spectral characteristics of this film were measured and found to be substantially similar to those exhibited by the polymer of Example 2. As a test of long-term stability under ambient conditions, the coated glass slide was taped to the interior face of a single pane window having an easterly exposure to form a configuration as illustrated in FIG. 2. The coated glass was allowed to remain in place for approximately 4 months. At the end of this period, spectra were again obtained and were found to be only very slightly changed (about a 12% decrease in near-IR absorption) over the original measurements.

EXAMPLE 4

A sample of an existing product for solar radiation control was obtained and tested (3M Scotchtint TM Sun Control Window Film). This product is manufactured by the Energy Control Products Division of the 3M Company and had the designation, High Performance Silver, P-19. Spectra were obtained in the wavelength range from 400 nm to 2500 nm. The absorption characteristics of this film varied only slowly with wavelength, increasing by approximately a factor of 2 in going from short to long wavelength (400 to 2500 nm). This 3M film displayed a transparency in the visible range of about 25%. The absobance of polyaniline coated by the method of Example 1 onto a Nylon film was also measured from 300 to 2500 nm. This data and that of Example 2 were adjusted to give a comparison of performance on an equivalent basis to that of the 3M Film. The effective thickness of the polymer film of Example 1poly(methoxythienylene vinylene) (PMxTV) on quartz, and polyaniline tosylate (PANI) on Nylon were adjusted to give a transparency to the visible part of the solar spectrum equivalent to 25%. The solar spectral irradiance measured at 38,000 feet elevation was assumed as the illumination source. The total irradiance from this source in the visible range (400 nm to 780 nm) and in the near-IR range (780 nm to 2500 nm) was calculated to be 0.0643 W/cm$^2$ and 0.0589 W/cm$^2$, respectively. For the purposes of this comprison, transparency in the visible and near-IR regions was defined as the ratio of filtered and unfiltered irradiance transmitted in these spectral ranges. The transmitted irradiance (in W/cm$^2$) was calculated numerically by evaluating the integral $\int E_\lambda 10^{-a^4} d2$ over the wavelength ranges, 400 to 780 nm and 780 to 2500 nm, where $\lambda$ is the wavelength, $E_\lambda$ is the solar spectral irradiance (in mW/(cm$^{21}$nm)), A is the measured absorbance, and "a" is a "thickness adjustment" factor used to normalize all the films to 25% transparency in the visible. The relative performance of the films can be judged by the last column of Table I below, which provides the ratio of visible to near-IR radiation transmitted through the film (the Transparency Ratio). A higher ratio means that for a given level of illumination, a higher fraction of solar infrared radiation is blocked. The high value observed for polyaniline (4.67) stems from the fact that polyaniline has a strong absorption which rises sharply at 620 nm and extends into the NIR. This absorption band efficiently blocks the solar NIR radiation but also causes the less desirable green tint of polyaniline.

TABLE I

Transmission Characteristics of Window Coatings Illuminated by Solar Radiation

| Color | Visible Bandwidth (nm) | Color | Visible Transparency (400 to 780 nm) | Ir Transparency | Transparency Ratio |
|---|---|---|---|---|---|
| None | 390–780 | Colorless | ≈100% | ≈100% | 1 |
| PMxTV | 400–780 | Blue-gray | 25% | 10.9% | 2.31 |
| PANI | 470–620 | Green | 25% | 5.4% | 4.67 |
| 3M P-19 | 400–780 | Blue-gray | 25% | 17.7% | 1.42 |

Having thus described the invention in rather full detail, it will be understood that such detail need not be strictly adhered to but that further changes and modifications may suggest themselves to one having ordinary skill in the art, all falling within the scope of the invention as defined by the subjoined claims.

We claim:

1. A method for minimizing radiative heat transfer and maximizing the transmission of visible light through a window, having at least one pane, comprising the step of: applying a transparent conductive polymer layer to said pane, said polymer layer being reflective and absorptive in an infrared region of the electromagnetic spectrum having a wavelength range extending from 780 to 2500 nm, being transparent in a visible region of the spectrum having a wavelength range extruding from 400 to 780 nm, and having a transparenccy ratio greater than 2.

2. A method as recited in claim 1, further comprising the step of coating said conductive polymer layer on a flexible plastic substrate which is then associated with said pane.

3. A method as recited in claim 2, further comprising the step of adhesively securing said substrate to said pane.

4. A method as recited in claim 2, wherein said window has a frame and said method further comprises the step of spacing said substrate from a face of said pane.

5. A method as recited in claim 4, wherein said window has a frame housing a plurality of panes, and said method further comprises the step of securing said substrate to said frame to space said polymer layer from a face of at least one of said panes, thereby forming a thermal break.

6. A method as recited in claim 4, wherein said window has a frame housing a plurality of panes, and said method further comprises the step of securing said substrate to said frame to space said coated plastic substrate from interior opposing faces of two of said panes, thereby forming a plurality of thermal breaks.

7. A method as recited in claim 6, comprising the step of adjusting said panes to be substantially parallel.

8. A method as recited in claim 5 or 6 comprising the step of sealing said window panes to isolate said space.

9. A method as recited in claim 8, wherein said sealing step includes the step of injecting an inert gas into said space to enhance the characteristics of said thermal break.

10. A method as recited in claim 9, wherein said inert gas is selected from the group consisting of argon, nitrogen, dry air, neon and mixtures thereof.

11. A method as recited in claim 1, wherein said transparent conductive polymer layer comprises a p-type (anion inserted) conjugated polymer.

12. A method as recited in claim 2, in which said p-type conjugated polymer is selected from the group consisting of polypyrrole, poly(furylene vinylene), poly(carbazole), poly(thienylene vinylene), polyacetylene, polyaniline, polyisothianaphthene and substituted versions thereof.

13. A method as recited in claim 12, in which poly(thienylene vinylene) is substituted in the 3 and/or 4 position by at least one member selected from methyl, ethyl, propyl, butyl, hexyl or octyl substituents.

14. A method as recited in claim 12, in which said poly(thienylene vinylene) is substituted in the 3 and/or 4 position by at least one member selected from the group cosisting of methoxy, ethoxy, propoxy, butoxy, hexoxy, or octyloxy substituents.

15. A method as recited in claim 11, in which said anion is a sulfonate.

16. A method as recited in claim 2, wherein the flexible plastic substrate is a polyester, polycarbonate or polyacrylate.

17. A method as recited in claim 8, wherein said sealing step further comprises the step of injecting a dopant gas, liquid or vapor into said space to adjust and maintain a doping level for said conductive polymer.

18. A method as recited in claim 2, wherein said flexible plastic substrate is a heat shrinkable polymer film.

19. A method as recited in claim 8, wherein said sealing step includes the step of injecting a dopant or dopant coinserting agent into said space.

20. A method as recited in claim 19, wherein said dopant coinserting agent is acetonitrile, benzonitrile, water or an organic alcohol.

21. A method as recited in claim 19, wherein the optical transparency of the conductive polymer film is varied via controlled variation in the gas pressure of the dopant or dopant coinserting agent.

22. The method of claim 1, wherein the conductive polymer layer is obtained with preferential chain alignment in one direction within the plane of the pane, so as to provide a polarizing effect.

23. The method of claim 22, wherein the polarizing direction of the conducting polymer layer is verticle, so as to minimize glare from reflected and scattered solar radiation.

24. The method of claim 1, wherein at least two layers of conductive polymers are directly or indirectly applied to the panes, or to a free standing plastic substrate film.

25. The method of claim 24, wherein at least two of said conducting polymer layers are partially chain oriented so that the directions of preferential alignment are mutually orthogonal.

26. The method of claim 1, wherein at least two different conducting polymers are used to form at least two layers of conducting polymers and wherein the transmission characteristics of the window are adjusted by selection of the relative thicknesses of the different polymer layers.

27. The method of claim 1, wherein the absorption characteristics of the window are optimized by varying the relative amounts of different conducting polymer components, including either conducting polymers of the same type but different average conjugation length, or conducting polymers of different polymeric or dopant compositions.

28. The method of claim 1, wherein the conducting polymer layer is combined with a second absorptive window coating material, including a metal, metal-oxide, or insulating dye coating, to optimize the absorption characteristics of the window.

29. The method of claim 1, wherein the thickness of the conducting polymer layer decreases progressively from the top to the bottom of the window pane.

30. The method of claim 1, wherein an additional window coating is employed, comprising a liquid crystal layer which is electrically switchable from a state of greater opacity to a state of lower opacity.

31. The method of claim 30, wherein at least one electrical contact to the liquid crystal layer comprises the conductive polymer layer.

32. The method of claim 1, wherein said window is a vehicle window and said conducting polymer provides a transparency for radiation in said visible region of the spectrum and a transparency for radiation in a far-infrared region of the electromagnetic spectrum having a wavelength extending from 2500 to 100,000 nm, the transparency for radiation said near-infrared region being less than that for radiation in said far-infrared region.

* * * * *